(12) United States Patent
Mackin et al.

(10) Patent No.: US 7,862,286 B2
(45) Date of Patent: Jan. 4, 2011

(54) UNLOADING SYSTEM FOR AN AGRICULTURAL HARVESTER

(75) Inventors: Ryan Patrick Mackin, Milan, IL (US); Daniel James Burke, Cordova, IL (US); Bruce Alan Coers, Hillsdale, IL (US); Mark Charles Depoorter, Coal Valley, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/434,043

(22) Filed: May 1, 2009

(65) Prior Publication Data

US 2010/0275563 A1  Nov. 4, 2010

(51) Int. Cl.
*B65F 1/00* (2006.01)
*B65F 3/00* (2006.01)

(52) U.S. Cl. .................. 414/519; 414/523; 414/502

(58) Field of Classification Search .......... 414/519, 414/527, 502, 489, 523, 310, 323, 505; 105/247, 105/250; 404/110; 239/650, 663, 668, 672, 239/674; 198/13, 582; 222/504, 23; 460/114, 460/23, 111, 119; 56/477
See application file for complete search history.

(56) References Cited

U.S. PATENT DOCUMENTS

| | | | | |
|---|---|---|---|---|
| 2,786,655 A | * | 3/1957 | Cowsert | 366/182.1 |
| 3,037,780 A | * | 6/1962 | Skromme et al. | 239/670 |
| 3,520,434 A | * | 7/1970 | Benchoff et al. | 414/502 |
| 3,641,764 A | * | 2/1972 | Destefan et al. | 60/484 |
| 3,677,540 A | * | 7/1972 | Weiss | 222/23 |
| 3,875,730 A | * | 4/1975 | Wood | 56/344 |
| 3,894,646 A | * | 7/1975 | Head et al. | 414/505 |
| 4,046,069 A | * | 9/1977 | Head | 100/255 |
| 5,108,249 A | * | 4/1992 | Kinzenbaw et al. | 414/523 |
| 5,424,957 A | * | 6/1995 | Kerkhoff et al. | 700/240 |
| 5,971,600 A | * | 10/1999 | Paterson et al. | 366/150.1 |
| 6,179,172 B1 | * | 1/2001 | Elder et al. | 222/504 |
| 6,682,417 B2 | * | 1/2004 | Covington et al. | 460/119 |
| 6,745,701 B2 | * | 6/2004 | Elder | 105/247 |
| 7,037,034 B2 | * | 5/2006 | Dillingham | 404/84.05 |
| 7,322,460 B2 | * | 1/2008 | Covington et al. | 198/581 |
| 7,543,765 B1 | * | 6/2009 | Elling | 239/663 |
| 2005/0169706 A1 | * | 8/2005 | Dillingham | 404/110 |
| 2007/0084378 A1 | * | 4/2007 | Creighton et al. | 105/247 |

* cited by examiner

*Primary Examiner*—Árpád Fábián-Kovács

(57) ABSTRACT

An unloading system for an agricultural harvester, includes a grain tank (16); a door (56) at the outlet of the grain tank (16) that is disposed to control the flow of grain out of the grain tank (16); a door actuator (84) coupled to the door (56) that is disposed to open and close the door; a first conveyor (30) disposed to receive grain passing through the door (56); a first conveyor drive motor (80) coupled to the first conveyor (30) to drive the first conveyor (30); a control circuit (72) coupled to both the door actuator (84) and the first conveyor drive motor (80), the control circuit (72) being configured to close the door (56) prior to shutting off the first conveyor (30) in response to an operator command to shut down the unloading system.

10 Claims, 5 Drawing Sheets

UNLOADING SYSTEM FOR AN AGRICULTURAL HARVESTER

FIELD OF THE INVENTION

The present invention relates to agricultural harvesters, and, more particularly to grain tanks and unloading systems in such harvesters.

BACKGROUND OF THE INVENTION

Agricultural harvesters, such as combines, include a head and a feeder housing which remove the crop material from the field, gather the crop material and transport the crop material to a separator in the harvester. The separator removes the grain crop material from the non-grain crop material. The grain is cleaned and deposited in a grain tank on the harvester. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

A trend in agricultural machines is for the size of the machines to become larger, reducing the number of passes required to cover a field. As the harvester width is increased, more grain is harvested during each pass over the field. Accordingly, it is desirable to increase the grain tank capacity to maximize productive crop harvesting time between unloading events. In many situations it is necessary to stop the harvester for unloading. Accordingly, it is desirable to reduce the frequency of unloading and to increase unloading efficiency to minimize the time required for unloading, and thereby maximize harvesting efficiency.

One apparatus for increasing the unloading rate is to provide high-speed endless-belt conveyors at an outlet of the grain tank to carry the grain into an unloading conveyor and thence into the grain cart or truck traveling alongside the vehicle. An example of this apparatus can be seen in U.S. patent application Ser. No. 12/173,583, which is assigned to Deere & Co., the assignee of the present patent application.

In the '583 application, a combine arrangement is shown in which a grain tank empties onto a cross conveyor to a door disposed to receive grain from the grain tank and to convey it to an unloading conveyor located at the side of the vehicle. In this arrangement, the door can be closed when the conveyor is not unloading, and opened for transferring grain to the cross conveyor and unloading.

In the '583 application, the door extends the entire width of the grain tank. When it opens, grain pours over the entire width onto the cross conveyor. If the cross conveyor is operating when the door is slightly opened, only a small amount of grain falls onto the cross conveyor and is carried away to the unloading conveyor. On the other hand, if the door is opened when the cross conveyor is not operating, the entire cavity in which the cross conveyor is disposed fills with grain. This applies significant downward pressure on the cross conveyor, which is transferred them to the substrate which supports the endless belt of the cross conveyor. This weight produces significant friction between the endless belt and the substrate which supports it, which can prevent the endless belt from being operated or can apply an excessive load to the cross conveyor and cross conveyor drive motor. In a similar fashion, if the unloading conveyor is not emptied upon shutdown, the grain remaining on the endless belt or auger of the unloading conveyor can cause excessive loads on the unloading conveyor drive motor on startup.

What is needed, therefore, is an unloading system that synchronizes the door opening and closing with the conveyor operation to ensure the conveyor or conveyors are not substantially loaded with grain when they are stopped. It is an object of this invention to provide such a system.

SUMMARY OF THE INVENTION

In accordance with the present invention, an unloading control system for an agricultural harvester grain tank is provided, the grain tank having an outlet and a door controlled by an actuator, the door being disposed at the outlet to regulate a flow of grain through the outlet. The grain tank has a conveyor disposed to receive grain from the grain tank and convey it to an unloading conveyor. The unloading control system includes a control circuit configured to sequence the startup and shutdown of the unloading system to reduce or eliminate the overloading of the cross conveyor.

To start up the unloading system, the control circuit starts the cross conveyor and then opens the door. To shut down the unloading system, the control circuit closes the door and then shuts down the cross conveyor.

DETAILED DESCRIPTION OF THE INVENTION

Figure 1:
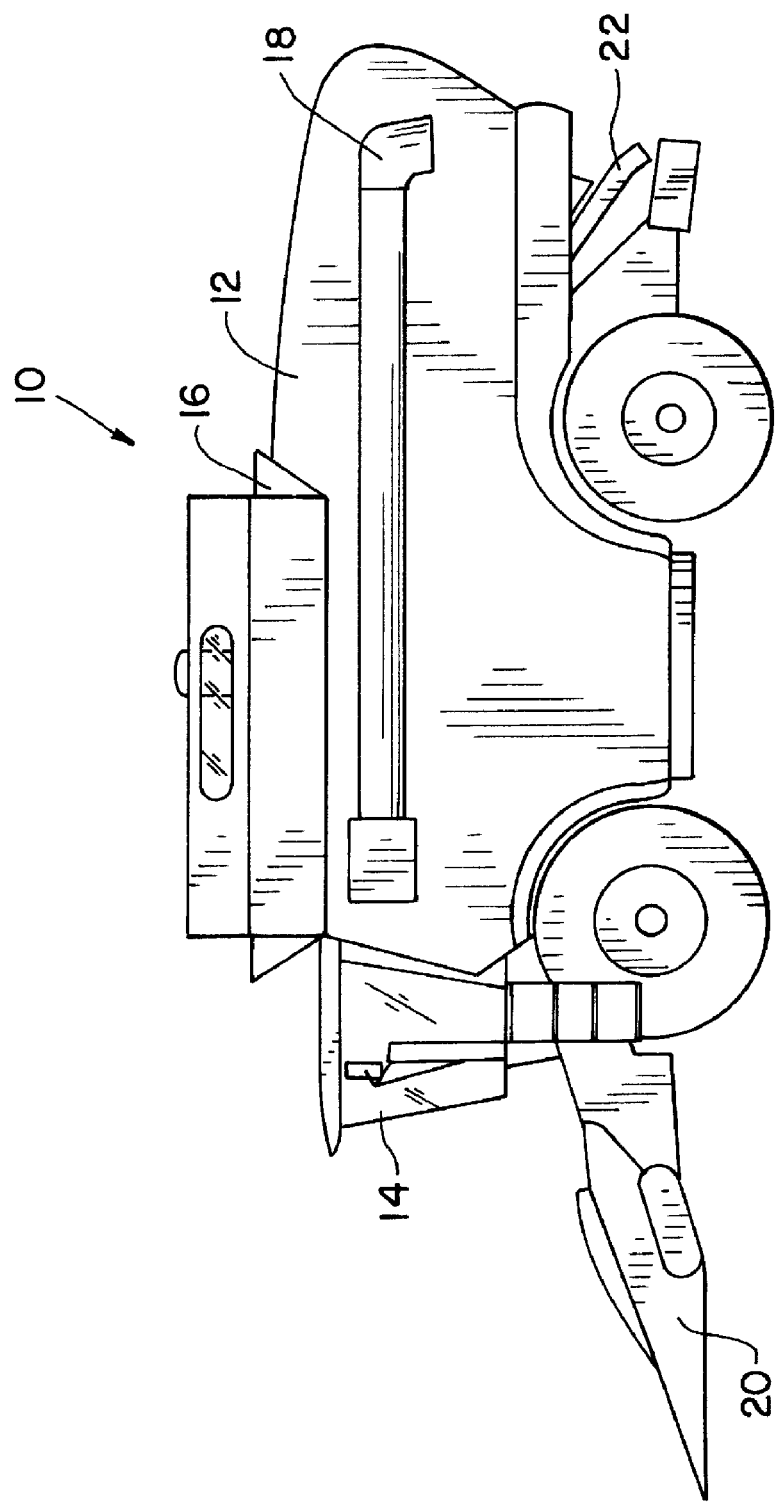
FIG. 1 is a perspective view of an agricultural harvester.

Referring now to the drawings, and more particularly to FIG. 1, there is shown an embodiment of an agricultural harvester 10. Harvester 10 generally includes a body 12, an operator cab 14, a grain tank 16 and an unloading conveyor 18 here shown as an auger-type conveyor. Harvester 10 is detachably coupled with a cutting platform or head 20 in front of operator cab 14. A crop material is removed from the field by head 20 and transported from head 20 into a separator within harvester 10. The grain is separated from the non-grain or refuse crop material, with the grain being transported into grain tank 16 and the non-grain refuse crop material being discharged back onto the field via a straw chopper 22.

Figure 2:
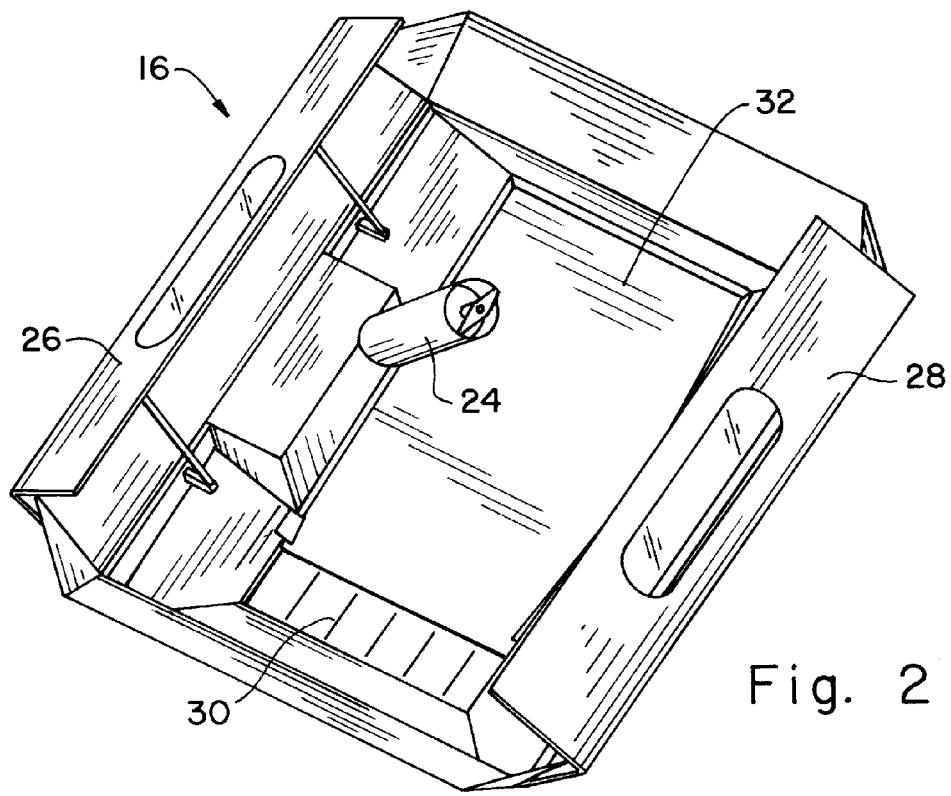
FIG. 2 is a fragmentary perspective view of the top of the harvester shown in FIG. 1.

Grain tank 16 receives grain from an auger 24, and may include a plurality of covers 26, 28 over the top thereof. A cross conveyor 30 at an end of grain tank 16 receives grain from grain tank 16 and transports the grain to unloading conveyor 18. FIG. 2 illustrates grain tank 16 in an opened condition to expose cross conveyor 30 during an unloading operation. An active floor 32 is provided in the bottom of grain tank 16 for active transport of grain thereon toward cross conveyor 30.

Figure 3:
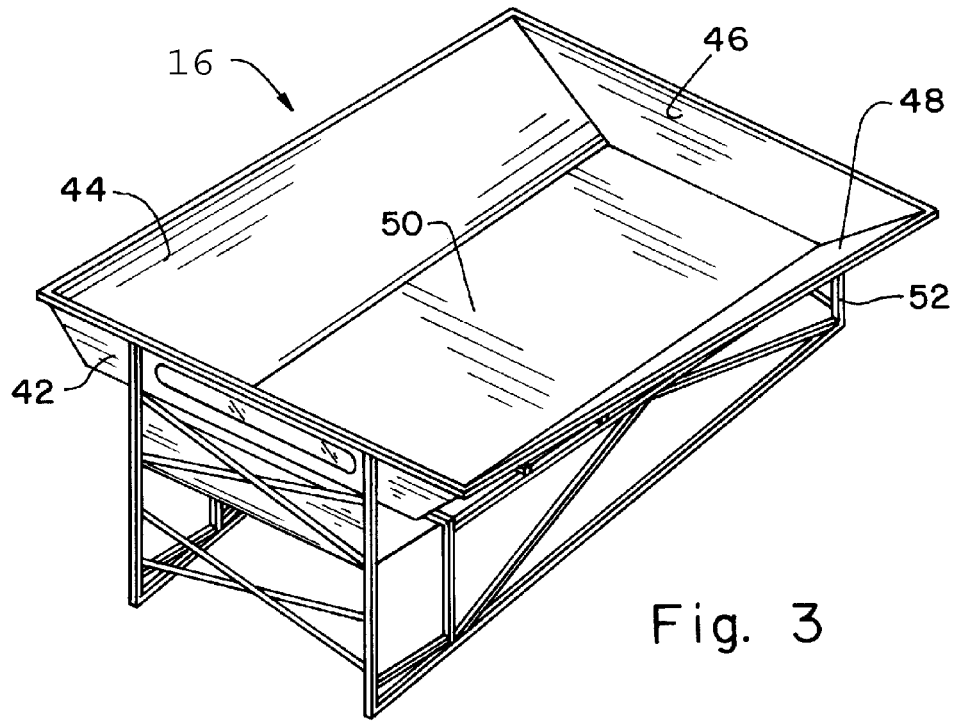
FIG. 3 is a perspective view of a grain tank having a belted floor in accordance with the present invention.

A simplified illustration of a grain tank 16 of the present invention is shown in FIG. 3. Grain tank 16 includes a plurality of side walls 42, 44, 46 and 48 defining a space for the receipt of grain therein. An active floor in the way of a belted conveyor floor 50 is provided at the bottom of grain tank 16 for actively transporting grain thereon. Other types of active floors also can be used, such as, for example, a drag chain. Grain tank 16 is supported in a harvester by a supporting framework 52 attached to harvester 10. Belted conveyor floor 50 forms the entire floor or bottom in grain tank 16, substantially spanning the entire area defined between the lower edges of side walls 42, 44, 46 and 48.

Figure 4:
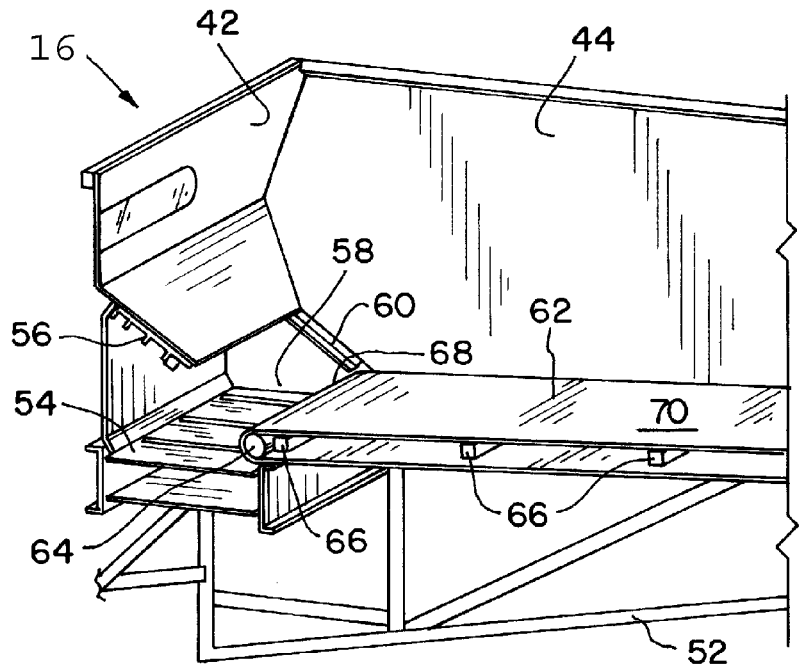
FIG. 4 is a cross-sectional view of the grain tank shown in FIG. 3, illustrating the grain tank open for emptying.
Figure 5:
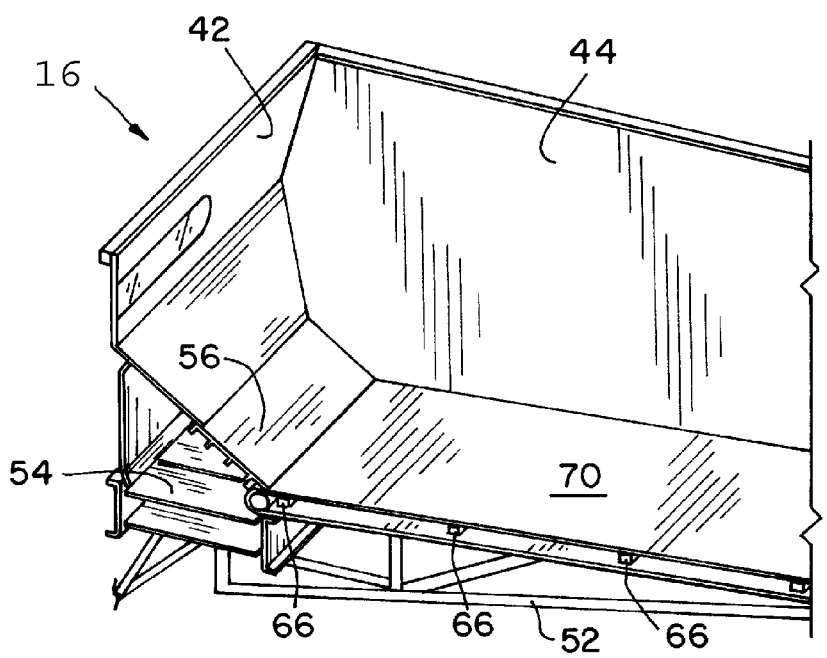
FIG. 5 is a cross-sectional view similar to that of FIG. 4, but illustrating the door of the grain tank closed.

With reference now to the cross-sectional views of FIGS. 4 and 5, a cross conveyor 30 is provided at an end of grain tank 16. A door 56 is provided in an opening 58 through which grain flows from grain tank 16 to cross conveyor 30. Door 56 is a sliding door operable in channels 60, one of which can be seen in FIG. 4. It should be understood that a second channel similar to channel 60 is provided at the side of opening 58 opposite from the side illustrated in FIGS. 4 and 5.

Betted conveyor floor 50 is a looped endless belt conveyor having an endless belt 62 supported about rollers 64 and support members 66. Support members 66 span the distance from one side wall to an opposite side wall of tank 40, and are disposed between upper and lower runs of looped endless belt 62. Support members 66 provide support to endless belt 62 having grain loaded thereon.

Belted conveyor 50 extends through opening 58 and has a discharge end 68 thereof positioned over cross conveyor 30. As can be seen in FIG. 5, door 56 closes opening 58 and slides against an upper surface 70 of belt 62. Even if some grain slides between belt 62 and door 56, since discharge end 68 of belted conveyor floor 50 overlies cross conveyor 30, the grain will accumulate on cross conveyor 30 for subsequent transport to unloading conveyor 18 during a next unloading operation, and the grain, thereby, is not lost.

Figure 6:
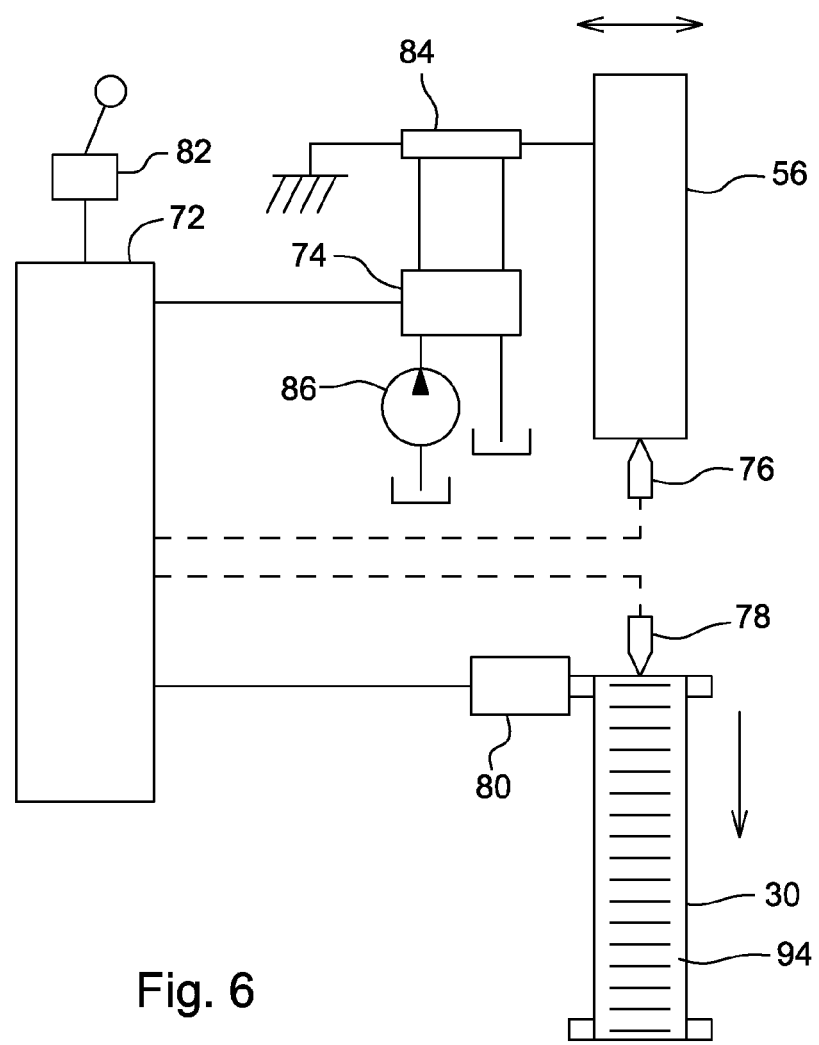
FIG. 6 is a schematic diagram of the unloading control system of the grain tank.

In FIG. 6, a control circuit, shown here as a digital electronic controller 72, is coupled to a control valve 74, a door position sensor 76, a cross conveyor speed sensor 78, a cross conveyor drive motor 80 and an operator input device 82. Control valve 74 is coupled to actuator 84, which in turn is coupled to door 56. Cross conveyor drive motor 80 is coupled to cross conveyor 30.

Door position sensor 76 is disposed to sense the degree of opening of door 56 and to generate a signal that it communicates to electronic controller 72 indicating the degree of opening of door 56.

Cross conveyor speed sensor 78 is disposed to sense the speed of cross conveyor 30 and to generate a signal that it communicates to electronic controller 72 indicating the speed of cross conveyor 30.

Operator input device 82 is responsive to manipulation by the operator. The operator uses operator input device 82 to command electronic controller 72 to start unloading and to stop unloading. Operator input device 82 responsibly generates a first signal indicating a start unloading command and a second signal indicating a stop unloading command. Operator input the box 82 communicates the signals to electronic controller 72.

Electronic controller 72 is configured to read the signals provided by door position sensor 76, cross conveyor speed sensor 78, and operator input device 82 and to generate the appropriate control signals to control valve 74 and cross conveyor drive motor 80. Control valve 74, in response to the signals it receives from electronic controller 72, responsively controls a flow of hydraulic fluid from hydraulic pump 86 to actuator 84. Actuator 84, in response to the flow of hydraulic fluid responsively opens and closes door 56. Cross conveyor drive motor 80, in response to the signals it receives from electronic controller 72, responsively drives cross conveyor 30.

Electronic controller 72 is configured to sequence the starting up and shutting down of the unloading system to prevent the overloading of cross conveyor 30.

When electronic controller 72 receives a signal from operator input device 82 indicating the operator's command to start unloading the combine and grain tank, electronic controller 72 sends an initial signal to cross conveyor drive motor 80 to start the motor, and hence to start cross conveyor 30. Electronic controller 72 monitors cross conveyor speed sensor 78. When electronic controller 72 determines that cross conveyor 30 is operating at the appropriate speed, it then sends a signal to control valve 74 commanding control valve 74 to open door 56. Control valve 74, in turn, communicates hydraulic fluid under pressure to actuator 84, which causes actuator 84 to open door 56.

By the time door 56 is opened, cross conveyor 30 is operating at a speed sufficient to keep grain from filling the cross conveyor chamber located below door 56 and applying excessive pressure to the endless belt 94 of cross conveyor 30.

When electronic controller 72 receives a signal from operator input device 82 indicating the operator's command to stop unloading the combine and grain tank, electronic controller 72 sends a signal to control valve 74 commanding control valve 74 to close door 56. Control valve 74, in turn, communicates hydraulic fluid under pressure to actuator 84, which causes actuator 84 to close door 56. Electronic controller 72 monitors door position sensor 76. When electronic controller 72 determines that door 56 is closed, it then sends a signal to cross conveyor drive motor 80 to stop the motor, and hence to stop cross conveyor 30.

By the time cross conveyor 30 is stopped, door 56 has been closed long enough to remove any grain on cross conveyor 30 leaving the endless belt of cross conveyor 30 empty. This ensures that upon the next startup there will be no grain load on cross conveyor 30.

Figure 7:
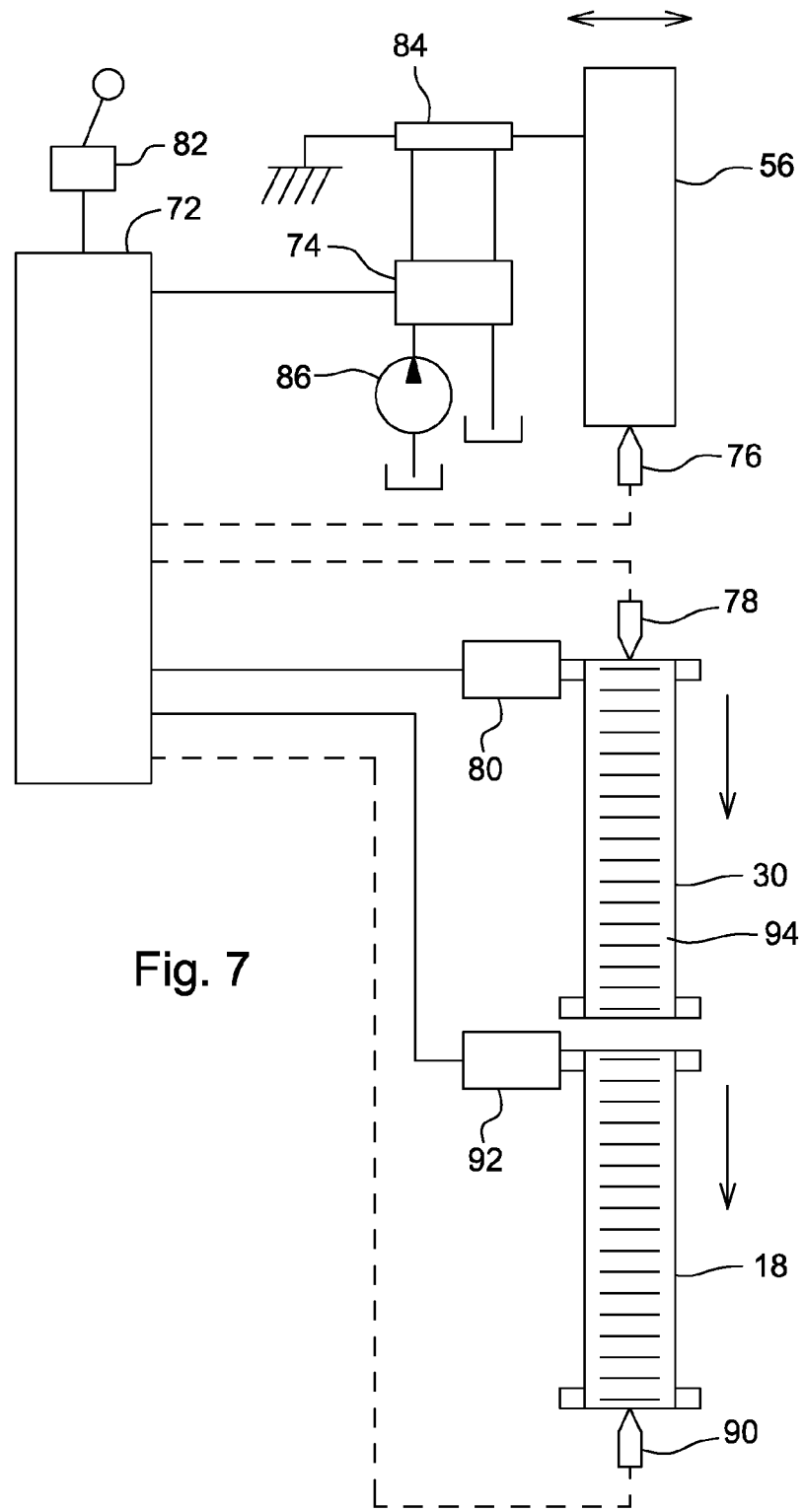
FIG. 7 shows a conveyor system that is identical to the system shown in FIG. 6, but with an additional unloading conveyor, unloading conveyor sensor, and unloading conveyor drive motor.

FIG. 7 shows a conveyor system that is identical to the system shown in FIG. 6, but with unloading conveyor 18, unloading conveyor sensor 90, and unloading conveyor drive motor 92. These three additional components are also coupled to electronic controller 72.

In the arrangement of FIG. 7, grain passing through opening 58 past door 56 is transmitted to cross conveyor 30. Grain leaving cross conveyor 30 is transmitted to unloading conveyor 18. Grain leaving unloading conveyor 18 is communicated to a grain tank or grain truck adjacent to the agricultural harvester 10.

The arrangement of FIG. 7 adds the unloading conveyor to the startup sequence and the shutdown sequence.

When electronic controller 72 receives a signal from operator input device 82 indicating the operator's command to start unloading the combine in grain tank, electronic controller 72 sends its initial signal not only to cross conveyor drive motor 80, but to unloading conveyor drive motor 92 as well. Electronic controller 72 similarly monitors unloading conveyor speed sensor 90 as well as cross conveyor speed sensor 78 to determine that both conveyors are up to speed before electronic controller 72 subsequently opens door 56 in the manner described above.

When electronic controller 72 receives a signal from operator input device 82 indicating the operator's command to stop unloading the combine and grain tank, electronic controller 72 closes door 56 and subsequently stops cross conveyor 30 before it stops unloading conveyor 18. Electronic controller 72 determines that cross conveyor 30 is stopped by monitoring cross conveyor speed sensor 78. When cross conveyor speed sensor 78 indicates that cross conveyor 30 is stopped, electronic controller 72 then stops unloading conveyor 18 by turning off unloading conveyor drive motor 92.

In the embodiments described above, electronic controller 72 monitors speed sensors to ensure that the door is actually opened or closed, and that the conveyors are actually running to ensure that the unloading system is not left with grain on its conveyors when the unloading system to shut down. In an alternative arrangement, electronic controller 72 does not monitor speed sensors, but relies on the passage of time to ensure that the door is closed before the conveyors are shut down and that the conveyors are started before the doors opened.

In this embodiment, electronic controller 72 starts up the unloading system by signaling the unloading conveyor 18 to start up, waiting a first predetermined time interval, then signaling the cross conveyor 30 to start up, waiting as second predetermined time interval, and then signaling control valve 74 to open door 56.

If no unloading conveyor 18 is provided, electronic controller 72 energizes cross conveyor 30, waits a predetermined time interval, and then signals control valve 74 to open door 56.

To shut down the unloading system, electronic controller 72 signals control valve 74 to close door 56, waits a first predetermined time interval, then signals cross conveyor 30 to stop, waits a second predetermined time interval, then signals unloading conveyor 18 to stop.

The predetermined time intervals in the above embodiment are preferably long enough to ensure that the conveyors are up to full speed before the door is opened on start up, and long enough to ensure that the door is closed and the conveyors are empty of grain on shut down.

In the embodiment above, a digital electronic controller 72 was illustrated. This controller can be a single digital device, or a plurality of digital controllers coupled together over a vehicle network. If digital electronic controller 72 is a plurality of digital controllers, each controller can perform one or more of the functions described above. There can be as many digital controllers coupled together over a vehicle network as there are functions described above to be performed.

Having described the preferred embodiment, it will become apparent that various modifications can be made without departing from the scope of the invention as defined in the accompanying claims.

For example, the control circuit comprises an electronic controller. In alternative arrangements it may comprise hydraulic or pneumatic control circuits. As another example, electronic controller is shown coupled to all of the devices that are monitored and driven. In an alternative embodiment, the electronic controller may comprise several networked digital controllers. These networked digital controllers may be in communication with each other over a distributed serial communication network.

The invention claimed is:

1. An unloading system of an agricultural harvester, comprising a grain tank (16); a door (56) at the outlet of the grain tank (16) disposed to control the flow of grain out of the grain tank (16); a door actuator (84) coupled to the door (56) disposed to open and close the door; a first conveyor (30) disposed to receive grain passing through the door (56); a first conveyor drive motor (80) coupled to the first conveyor (30) to drive the first conveyor (30); a control circuit (72) coupled to both the door actuator (84) and the first conveyor drive motor (80), the control circuit (72) being configured to close the door (56) and subsequently to shut off the first conveyor (30) in response to an operator command to shut down the unloading system.

2. The unloading system of claim 1, wherein the control circuit (72) is also configured to start the first conveyor (30 and subsequently to open the door (56) in response to an operator command to start up the unloading system.

3. The unloading system of claim 1, further comprising a door position sensor (76) disposed to indicate a position of the door (56), the door position sensor (76) being coupled to the control circuit (72), and the control circuit (72) being configured to selectively shut down the first conveyor (30) in response to a signal from the door position sensor (76).

4. The unloading system of claim 2, further comprising a first conveyor speed sensor (78) disposed to indicate a speed of the first conveyor (30), the first conveyor speed sensor (78) being coupled to the control circuit (72), and the control circuit (72) being configured to selectively open the door (56) in response to a signal from the first conveyor speed sensor (78).

5. The unloading system of claim 1, wherein the control circuit (72) is configured to sequentially shut down the unloading system by first signaling the door actuator (84) to close the door, waiting a predetermined period of time, then signaling the first conveyor motor (80) to stop.

6. The unloading system of claim 2, wherein the control circuit (72) is configured to sequentially start up the unloading system by signaling the first conveyor (30) to start operating, waiting a predetermined period of time, then signaling the door actuator (84) to open the door (56).

7. The unloading system of claim 1, in which the first conveyor (30) comprises an endless belt.

8. An unloading system of an agricultural harvester, comprising a grain tank (16); a door (56) at the outlet of the grain tank (16) disposed to control the flow of grain out of the grain tank (16); a door actuator (84) coupled to the door (56) disposed to open and close the door; a first conveyor (30) disposed to receive grain passing through the door (56); a first conveyor drive motor (80) coupled to the first conveyor (30) to drive the first conveyor (30); a control circuit (72) coupled to both the door actuator (84) and the first conveyor drive motor (80), the control circuit (72) being configured to close the door (56) prior to shutting off the first conveyor (30) in response to an operator command to shut down the unloading system, further comprising a second conveyor (18) and a second conveyor drive motor (92) coupled to the second conveyor (18) to drive the second conveyor, the control circuit (72) being coupled to the second conveyor drive motor (92), the control circuit (72) being configured to shut off the first conveyor (30) prior to shutting off the second conveyor (18) in response to the operator command to shut down the unloading system.

9. The unloading system of claim 8, in which the control circuit (72) is configured to provide a predetermined time interval between signaling the first conveyor (30) to shut off and signaling the second conveyor (18) to shut off.

10. The unloading system of claim 9, in which the second conveyor (18) comprises an endless belt.

* * * * *